Figure 7:
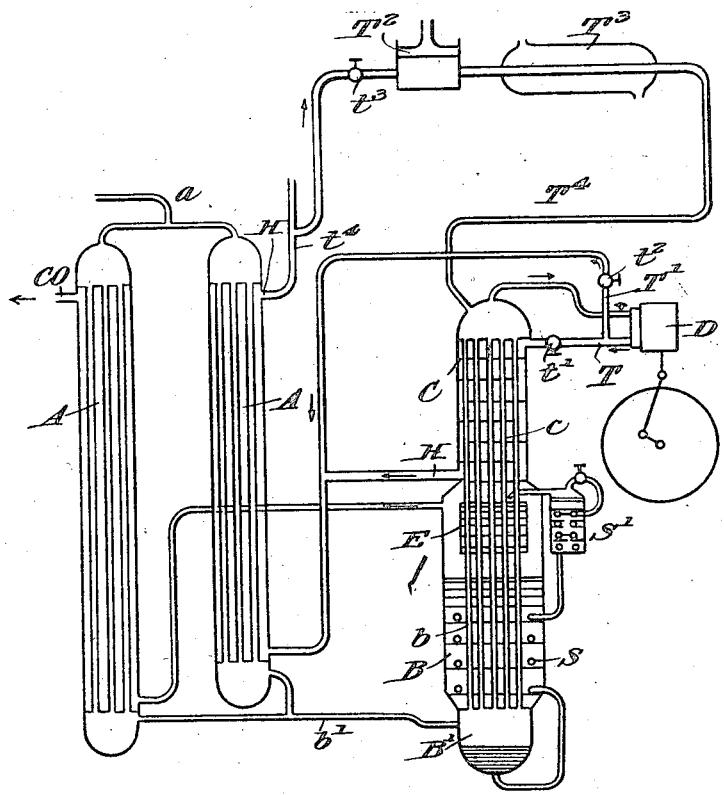

G. CLAUDE.
SEPARATION OF THE CONSTITUENTS OF GASEOUS MIXTURES.
APPLICATION FILED MAY 23, 1914.
1,212,455.
Patented Jan. 16, 1917.
3 SHEETS—SHEET 1.
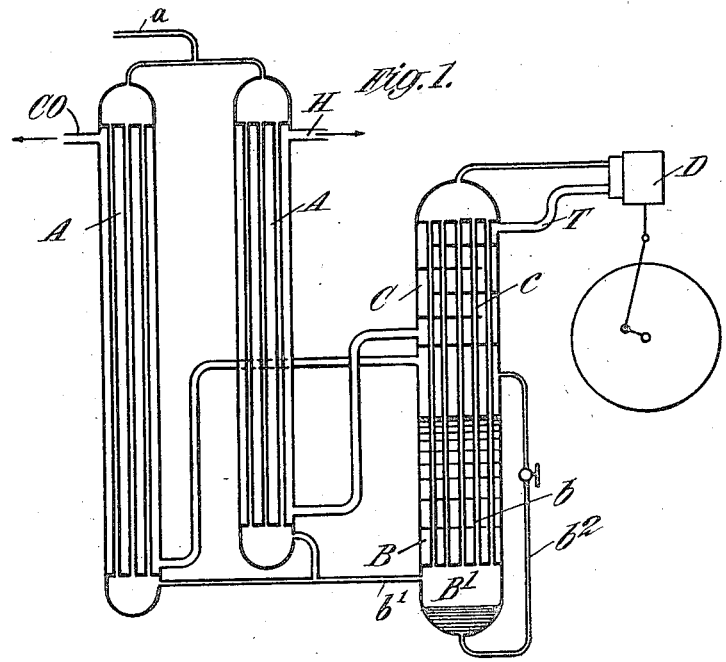
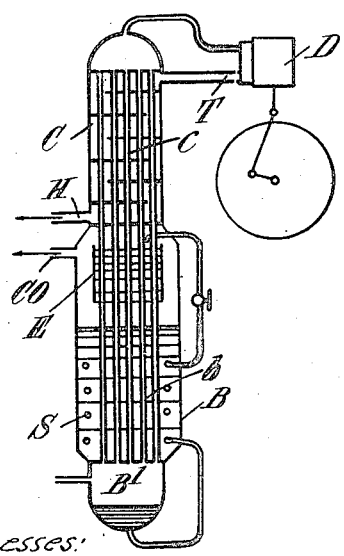
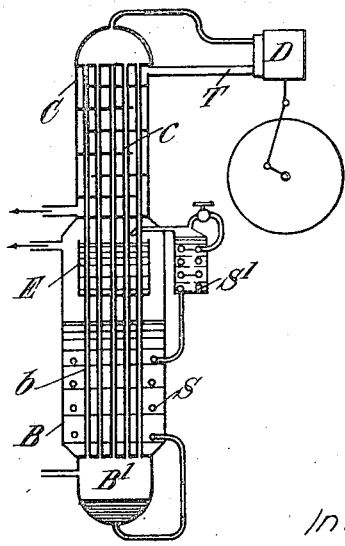
Witnesses:
Inventor:
Georges Claude

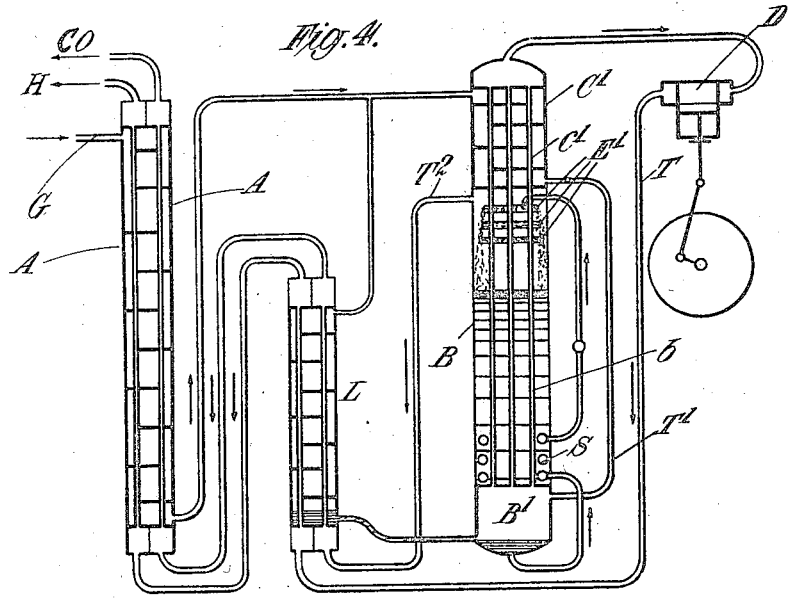
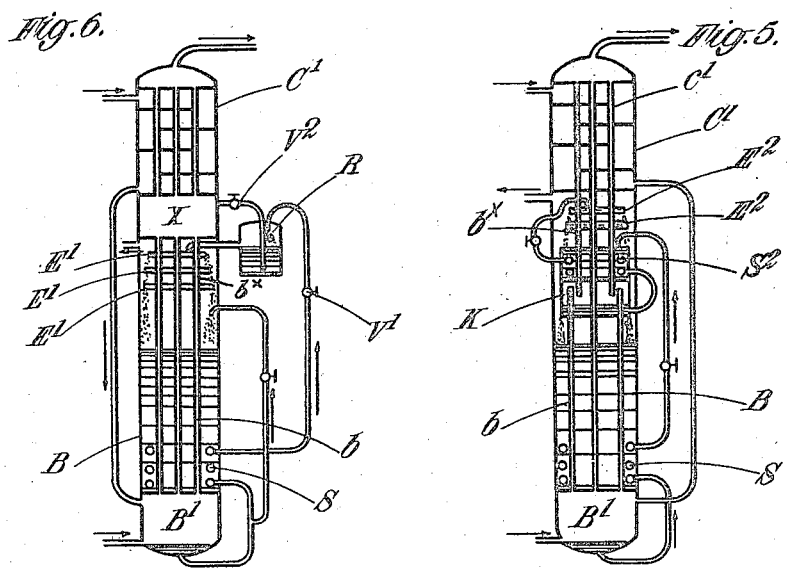

G. CLAUDE.
SEPARATION OF THE CONSTITUENTS OF GASEOUS MIXTURES.
APPLICATION FILED MAY 23, 1914.

1,212,455.

Patented Jan. 16, 1917.
3 SHEETS—SHEET 3.

Inventor:
Georges Claude

UNITED STATES PATENT OFFICE.

GEORGES CLAUDE, OF PARIS, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

SEPARATION OF THE CONSTITUENTS OF GASEOUS MIXTURES.

1,212,455.  Specification of Letters Patent.  Patented Jan. 16, 1917.

Application filed May 23, 1914. Serial No. 840,585.

*To all whom it may concern:*

Be it known that I, GEORGES CLAUDE, a citizen of the Republic of France, residing at 48 Rue St. Lazare, Paris, in the Republic of France, have invented certain new and useful Improvements Relating to the Separation of the Constituents of Gaseous Mixtures of which the following is a specification.

This invention relates to the separation of the constituents of gaseous mixtures. In the specification of the French Patent No. 329839 a process is described for the separation of the constituents of mixtures of gases liquefiable at very different temperatures and in particular for the separation of hydrogen and carbon monoxid from water gas. In principle, this known process consists in passing the water gas under pressure through a temperature exchanger and thence through but in indirect contact with liquid carbon monoxid resulting from the process of separation upon preceding portions of the water gas, the said liquid carbon monoxid being under atmospheric pressure or a less pressure, it being understood that the liquid boils and produces a very low temperature, thereby causing the greater part of the gaseous carbon monoxid of the compressed water gas to condense; the uncondensed residue (chiefly hydrogen) of the water gas is then subjected to a still lower temperature as hereinafter mentioned, whereby the remaining carbon monoxid is condensed. Practically pure hydrogen is therefore obtained in gaseous form, and as this gas is still under pressure it is conducted to an engine in which it expands and performs external work. This expansion cools the hydrogen exceedingly, and in its cool expanded condition it is utilized to produce the lower temperature above referred to.

The chief object of the present invention is to improve the process above outlined, with a view to effecting a more thorough elimination of the carbon monoxid from the hydrogen.

Several methods of improvement may be adopted as will now be described, and they may be applied separately or together, according to circumstances.

For the sake of simplicity and clearness, the further description of the invention will be given with reference to water gas.

According to one feature of the present invention the condensed carbon monoxid under pressure is circulated, while still under pressure, in indirect contact with a quantity of the liquid carbon monoxid undergoing evaporation at atmospheric or less than atmospheric pressure by heat interchange with the compressed and cooled water gas. The lowering of the temperature of the condensed carbon monoxid enables it to hold in solution a relatively large proportion of hydrogen for the purpose hereinafter explained. In addition, the condensed carbon monoxid under pressure may, if desired, undergo a double circulation, first by indirect contact with the carbon monoxid that is actually undergoing evaporation by heat interchange with the water gas under treatment, and then by indirect contact with liquid carbon monoxid outside the main apparatus. Alternatively or in addition to the above described method of lowering the temperature of the condensed carbon monoxid, this liquid, before entering the vessel in which it is vaporized by heat interchange with the water gas under treatment, may be subjected to a cooling action produced by passing through it a stream of the separated hydrogen. Also in order that the liquid discharged in the vaporizing vessel may perform its function to the best advantage it may be made to overflow from one vessel or receiver to another after the manner of a rectifying column such as used in separating the constituents of liquid air. Furthermore in order to increase the quantity of hydrogen expanded in the expansion engine and afterward employed in further cooling the water gas from which much of the carbon monoxid has already been removed by liquefaction, a part of this hydrogen after performing the said cooling may be compressed, cooled, and added to the compressed hydrogen that is proceeding to the expansion engine.

A further feature of the invention, which may be adopted independently of or in conjunction with the features already described, consists in heating the compressed hydrogen proceeding to the expansion engine from the apparatus in which it has been freed from carbon monoxid by liquefaction of the latter, and in simultaneously cooling a portion of the water gas under treatment after its passage through a heat exchanger, by providing for heat interchange between them, as hereinafter more fully explained. The remaining portion of the water gas may be utilized in a liquefying apparatus to heat the separated and expanded constituents of the water gas before they serve as counter currents in the heat exchangers.

An alternative way of raising the temperature of the compressed hydrogen temporarily is to direct the expanded hydrogen issuing from the expansion engine so that it no longer acts as a counter current to the compressed hydrogen proceeding to the engine, this diversion of the expanded hydrogen being useful if the tubes conveying the compressed gas become choked with solidified carbon monoxid or nitrogen.

In order that the invention may be clearly understood and readily carried into effect the same will now be described more fully with reference to the accompanying drawings, in which:—

Figure 1 represents diagrammatically apparatus adapted to carry out the principle disclosed in the French patent referred to. Figs. 2 to 7 represent diagrammatically different arrangements adapted to operate in accordance with the present invention.

Referring first to Fig. 1, A A represent two temperature exchangers, B is the lower part, or so-called vaporizer, and C is the upper part, of an incased nest of vertical tubes $b$ $c$ constituting a carbon monoxid separator, and D is an engine adapted to perform external work. Compressed water-gas enters the exchangers A A by the pipe $a$ and leaves by the pipe $b'$, whence it enters a chamber B' and thence ascends the tubes $b$ $c$. The tubes $b$ $c$ at their lower parts $b$ are surrounded by the liquid carbon monoxid that has collected in the chamber B' as the result of the treatment of preceding quantities of water gas and has passed thence by the pipe $b^2$ into the space around the parts $b$ of the tubes. A large proportion of the gaseous carbon monoxid in the compressed and cooled water gas ascending the tubes $b$ $c$ is condensed in the lower parts $b$ of the tubes and flows into the chamber B', and the greater part of the residual gaseous carbon monoxid is condensed in the upper parts $c$ of the tubes around which circulates the cold expanded hydrogen that has passed from the tubes $b$ $c$ into and through the engine D and thence along the pipe T. This expanded hydrogen, and the vaporized carbon monoxid from the vaporizer B, pass through the two temperature exchangers A A and escape at the pipes marked H and CO respectively.

Referring now to the various improved arrangements adapted to operate in accordance with the present invention, it is seen that in Fig. 2 the condensed carbon monoxid collected under pressure in the chamber B' is caused to pass, still under pressure, through a cooling coil S immersed in the carbon monoxid in process of evaporation in the vaporizer B and it is only after this cooling under pressure has taken place that the carbon monoxid is decanted into an upper tier E of the vaporizer B, from which tier it descends through an overflow into the lower part of the vaporizer. The reason for this arrangement is as follows:—the liquid carbon monoxid formed under pressure in the tubes $b$ $c$ always carries with it in solution a certain quantity of hydrogen. If this liquid were to be decanted direct into the vaporizer B without being cooled, the evaporation that takes place on decantation, when the pressure on the liquid falls to atmospheric pressure, would act solely upon the dissolved hydrogen and it would be almost pure carbon monoxid, the temperature of which is relatively high, that would collect around the nest of tubes. When, however, the liquid carbon monoxid is cooled under pressure, as in the coil S, the evaporation on decantation into the vaporizer B is much less and the liquid discharged contains in solution a large proportion of hydrogen, that is to say substantially liquefied hydrogen, so that its temperature is much lower and it is therefore able to act in the upper tier E of the vaporizer so that it will produce a more perfect condensation of the carbon monoxid in the gases ascending the tubes, thereby reducing the purifying action that the expanded hydrogen is called upon to perform.

The cooling of the liquid carbon monoxid under pressure can be still further accentuated prior to its decantation into the vaporizer by causing it to circulate, after its passage through the first coil S, in a second coil $S^1$ as shown in Fig. 3, this second coil being immersed in the decanted liquid. In this apparatus a kind of cumulative effect is produced, the outer liquid being cooled increasingly in proportion as it cools the liquid under pressure more; the very cold liquid thus obtained is discharged onto the second tier E of the vaporizer B and acts in the manner already explained, but in a still more complete manner. Above the tier E the nest of tubes is continued through a part C of the separator where the supplementary purification by expanded hydrogen derived from the engine D takes place. Finally, another method of accentuating the cooling of the liquid carbon monoxid is to pass into the liquid, before it enters the vaporizer, a gaseous stream of the uncondensed constituent (hydrogen) as hereinafter described with reference to Fig. 6, because it is known that such a stream will cool the liquid far below its normal boiling point.

In one or other of these cases a well known cumulative effect will still further increase the extent to which the temperature can be lowered.

Expansion with external work is not adapted to furnish good results readily, especially with a gas as light as hydrogen and at as low a temperature as that at which it is necessary to operate in the present invention, unless the quantity of gas is sufficiently large to supply an expansion engine of considerable dimensions. Now this is not the case with small apparatus, especially as at least half the mixture of the gases under treatment is liquefied before reaching the engine. The result is that, especially with small apparatus, the conditions are poor. There is a method of remedying this defect, and this forms one of the objects of the present invention. It consists in taking a portion of the expanded hydrogen proceeding from the apparatus (see Fig. 7) through a pipe $t^4$ and past the valve $t^3$ to a compressor $T^2$, compressing it, cooling it in a special compartment of a temperature exchanger $T^3$, and causing it to pass through a pipe $T^4$ so as to mix with the compressed hydrogen proceeding to the expansion engine from the carbon monoxid separator. The quantity of hydrogen which expands in the engine and which produces the very low temperature around the nest of tubes of the carbon monoxid separator is thus increased to such an extent as is considered desirable, by the entire quantity of hydrogen of this special circuit, which latter does not, strictly speaking, necessitate any expenditure of gas, because the circuit is a kind of closed circuit through which a single mass of hydrogen proceeds indefinitely. The quantity of expanded hydrogen that circulates around the nest of tubes of the carbon monoxid separator to effect the purification of the hydrogen ascending the same, can, under these conditions, preponderate largely relatively to the quantity of impure compressed hydrogen which ascends in the nest, and the very low temperature of the expanded hydrogen is then able to act integrally.

Two points still remain to be considered in accordance with the more or less complete conditions realized in the apparatus above described. If the purity of the compressed hydrogen on leaving the nest of tubes is not complete, the unremoved carbon monoxid condenses in the form of mist at the end of the expansion, and it is necessary to separate this liquefied carbon monoxid carefully from the expanded hydrogen by means of a suitable separating filter interposed in the path of the expanded hydrogen in front of the carbon monoxid separator.

When the means indicated in the present specification for lowering the temperature are adopted, it may happen that the last portions of carbon monoxid, and also some nitrogen, will be deposited in the solid state toward the upper ends of the tubes of the carbon monoxid separator. Unless care be taken, this deposit will speedily obstruct the apparatus. In order to remedy this, it is only necessary, each time an obstruction is about to be produced (which will be indicated by the pressure gage arranged in front of the inlet to the apparatus), to cease for a moment the supply of expanded hydrogen to the separator by opening valve $t^2$ and closing valve $t'$, to send it directly toward the exchanger. The temperature in the obstructed zone will then rise very rapidly several degrees and the solid deposit will slide toward the warmer zones of the apparatus. Nevertheless, although the arrangements described above fulfil their purpose well, that is to say the more volatile constituent is obtained in a state of great purity, they present inconvenience as regards the expenditure of energy required by the process. The expansion temperature is not very low except on condition that the temperature of admission to the expansion engine is also very low and this is precisely what takes place with the process in question, because, in the case of a mixture of hydrogen and carbon monoxid, the compressed hydrogen reaches the expansion engine after its passage first through the bath of liquid carbon monoxid, and then through the still colder region of the expanded hydrogen. Under these conditions, the yield of the expansion is relatively poor and it is necessary to operate at considerable pressures in order to maintain the calorific balance and in order that the quantity of liquid operative may not diminish. Another object of the present invention is to remedy this defect; in order to do so the very low temperature necessary to complete the purification of the more volatile constituent of the water gas is obtained solely from the liquid formed in the process itself, thus rendering it possible to modify the conditions of the expansion in such a manner as to increase the efficiency. One way of attaining this object is to adopt in a more complete manner a procedure referred to above, that is to say the cooling of the constituent liquefied under pressure before its decantation into the vaporizer and the cooling of this liquid by a current of the more volatile constituent. It may here be stated that in accordance with what has been ascertained, the temperature obtained under these conditions is sufficient, in appropriate circumstances indicated below, to insure a very complete purification of the more volatile constituent.

By realizing the conditions referred to above, it becomes unnecessary to obtain a very low temperature by the expansion of the more volatile constituent and it becomes possible to have regard only to rendering this expansion as efficacious as possible from the point of view of the quantity of cold produced. Now in this respect the problem is exactly analogous to the problem arising in the liquefaction of air by expansion with external work, and the solution is identical, that is to say to bring to the expansion engine the compressed gas to be expanded at a temperature as high as permitted in obtaining an expansion temperature compatible with the object in view, that is to say the partial liquefaction of the gaseous mixture treated.

By way of example the manner in which it is possible to realize the conditions indicated above in one of the most interesting cases will now be described; this case is the separation of a mixture of hydrogen and carbon monoxid with a view to the manufacture of hydrogen.

Referring to Fig. 4 it will be noted that the compressed water gas to be treated entering at G is distributed in the bipartite temperature exchanger A A, where it circulates in counter current to the carbon-monoxid and the hydrogen already separated. This water gas then enters the part C′ of the separator B, C′, cold and under pressure. There it circulates around the parts $c'$ of the nest of tubes $b\ c'$ conveying the compressed hydrogen resulting from the partial liquefaction in the nest and is still further cooled by contact therewith. It then passes through a pipe T′ to the chamber B′ and thence ascends the nest of tubes and encounters increasingly low temperatures; it is deprived of its carbon monoxid by passage through this nest. On reaching the portions of the tubes situated within the part C′ of the separator, the hydrogen becomes vigorously heated in contact with the external water gas and subsequently reaches the engine D to be expanded therein. The expanded hydrogen issuing at T, and also the vaporized carbon monoxide issuing at $T^2$, before they are sent into their respective exchanger compartments, pass into two separate compartments of a liquefaction apparatus L supplied with a portion of the water gas that issues from the exchanger A A. The liquid formed in this liquefaction apparatus L unites with that formed in the separator B C′, is cooled with it under pressure in the coil S and is discharged in the upper part of the vaporizer B onto successive plates E′, E′, E′ for example; the liquid thus discharged then creates in the upper part of the vaporizer B, by reason of the hydrogen that it momentarily contains, the very low temperature necessary for completing the purification of the gases ascending from the portions of the tubes immersed in the liquid in the vaporizer B. If necessary, this temperature may be still further lowered in the uppermost part of the vaporizer by discharging onto plates $E^2$, as shown in Fig. 5, the liquid produced in the parts $b^x$ of the nest of tubes, collected in a special compartment K, and cooled under pressure in a coil $S^2$. As a supplementary resource, if necessary, the entire gamut of temperatures may be lowered by maintaining a reduced pressure upon the liquid in the vaporizer.

Another method of obtaining the necessary low temperature in the parts $b^x$ of the nest of tubes consists, as shown in Fig. 6, in discharging into this region a portion of the liquid carbon monoxid, regulated by a valve V′ and subjected in a vessel R to a stream of hydrogen extracted from a compartment X in quantities regulated by a valve $V^2$, the delivery through which is increased in proportion as it is desired to lower the temperature more.

The various methods of cooling indicated above may be combined one with the other to meet requirements.

Owing to the provision of the liquefying apparatus L in Fig. 4, the separate gases sent into the exchangers are vigorously heated and cool to the minimum the water gas that enters, the result being that the heating of the hydrogen in the extension of the separator is as great as possible and the efficiency of the expansion the maximum.

As indicated above, in the case of apparatus of small dimensions, notwithstanding the improvements indicated above, the refrigeration effect might be insufficient to insure the operation of the apparatus. The supplementary cold required may be obtained by re-compressing a portion of the hydrogen produced, the supplementary hydrogen thus compressed being sent, after cooling, to mix with the compressed hydrogen issuing from the carbon-monoxid separator.

What I claim and desire to secure by Letters Patent of the United States is:—

1. A process of separation of the constituents of a mixture of gases liquefiable at very different temperatures which consists in passing the compressed and cooled gases through but in indirect contact with a quantity of the more readily condensable constituent in liquid form and under atmospheric or less pressure; subjecting the uncondensed residue to a still lower temperature and passing the more readily condensable constituent after liquefaction but while still under pressure through but in indirect contact with a quantity of the liquid under atmospheric or less pressure.

2. In a process of separation of the constituents of a mixture of gases liquefiable at very different temperatures by passing the compressed and cooled gases through but in indirect contact with a quantity of the more readily condensable constituent in liquid form and under atmospheric or less pressure; subjecting the uncondensed residue to a still lower temperature and passing the more readily condensable constituent after liquefaction but while still under pressure through but in indirect contact with separate and successive quantities of the liquid under atmospheric or less pressure.

3. In a process of separation of the constituents of a mixture of gases liquefiable at very different temperatures by passing the compressed and cooled gases through but in indirect contact with a quantity of the more readily condensable constitutent in liquid form and under atmospheric or less pressure; causing the more readily condensable constituent after liquefaction under pressure to come repeatedly into indirect contact with the compressed gas mixture under treatment by collecting in stages around the path pursued by the compressed gas mixture.

4. In a process of separation of the constituents of a mixture of gases liquefiable at very different temperatures by passing the compressed and cooled gases through but in indirect contact with a quantity of the more readily condensable constitutent in liquid form and under atmospheric or less pressure; passing the more readily condensable constituent after liquefaction but while still under pressure through but in indirect contact with a quantity of the liquid under atmospheric or less pressure, and then causing the said readily condensable constituent to come into indirect contact with the compressed gas mixture under treatment by collecting in stages around the path pursued by the compressed gas mixture.

5. In a process of separation of the constituents of a mixture of gases liquefiable at very different temperatures by passing the compressed and cooled gases through but in indirect contact with a quantity of the more readily condensable constituent in liquid form and under atmospheric or less pressure; causing a stream of the unliquefied constituent derived from the separation to pass through the liquefied constituent before the latter is utilized to cool the gaseous mixture under treatment.

6. In a process of separation of the constituents of a mixture of gases liquefiable at very different temperatures, passing the compressed and cooled gases through but in indirect contact with a quantity of the more readily condensable constituent in liquid form and under atmospheric or less pressure, causing a stream of the unliquefied constituent derived from the separation to pass through the liquefied constituent before the latter is utilized to cool the gaseous mixture under treatment, and passing the unliquefied residue of the compressed and cooled gases through but in indirect contact with a quantity of the unliquefied constituent after its expansion with production of external work.

7. In a process of separation of the constituents of a mixture of gases liquefiable at very different temperatures by passing the compressed and cooled gases first through but in indirect contact with a quantity of the more readily condensable constituent in liquid form and under atmospheric or less pressure, and then through but in indirect contact with the uncondensed constituent after its expansion; adding to the latter constituent, before its expansion with production of external work takes place, a quantity of the said constituent after its expansion and after recompression and cooling.

8. In a process of separation of the constituents of a mixture of gases liquefiable at very different temperatures by passing the compressed and cooled gases first through but in indirect contact with a quantity of the more readily condensable constituent in liquid form and under atmospheric or less pressures, and then through but in indirect contact with the uncondensed constituent after its expansion; interrupting temporarily the indirect contact between the compressed and cooled gases and the uncondensed and expanded constituent.

9. In a process of separation of the constituents of a mixture of gases liquefiable at very different temperatures by passing the compressed and cooled gases through but in indirect contact with a quantity of the more readily condensable constituent in liquid form and under atmospheric or less pressure; passing the more readily condensable constituent after liquefaction but while still under pressure through but in indirect contact with a quantity of the liquid under atmospheric or less pressure, and heating the unliquefied constituent under pressure derived from the separation before its expansion with production of external work.

10. In a process of separation of the constituents of a mixture of gases liquefiable at very different temperatures by passing the compressed and cooled gases through but in indirect contact with a quantity of the more readily condensable constituent in liquid form and under atmospheric or less pressure, passing the more readily condensable constituent after liquefaction but while still under pressure through but in indirect contact with a quantity of the liquid under atmospheric or less pressure, and subjecting the unliquefied constituent under pressure derived from the separation to heat interchange with a portion of the compressed and cooled gas mixture to be treated.

11. In a process of separation of the constituents of a mixture of gases liquefiable at very different temperatures by passing the compressed and cooled gases through but in indirect contact with a quantity of the more readily condensable constituent in liquid form and under atmospheric or less pressure; subjecting the unliquefied constituent under pressure derived from the separation to heat interchange with a portion of the compressed and cooled gas mixture, passing the more readily condensable constituent after liquefaction but while still under pressure through but in indirect contact with a quantity of the liquid under atmospheric or less pressure and liquefying the remainder of the compressed and cooled gas mixture by heat interchange with the separated and expanded constituents resulting from the process.

12. In a process of separation of the constituents of a mixture of gases liquefiable at very different temperatures by passing the compressed and cooled gases through but in indirect contact with a quantity of the more readily condensable constituent in liquid form and under atmospheric or less pressure; passing the more readily condensable constituent after liquefaction but while still under pressure through but in indirect contact with a quantity of the liquid under atmospheric or less pressure, and causing a stream of the unliquefied constituent derived from the separation to pass through the liquefied constituent before the latter is utilized to cool the gaseous mixture under treatment.

In testimony whereof I affix my signature in presence of two witnesses.

GEORGES CLAUDE.

Witnesses:
PIERRE HOURLIER,
CHAS. P. PRESSLY.